(12) United States Patent
George

(10) Patent No.: US 10,233,992 B2
(45) Date of Patent: Mar. 19, 2019

(54) ELASTOMERIC BEARING COMPONENT WITH WEDGE-SHAPED SHIMS

(71) Applicant: Aktiebolaget SKF, Göteborg (SE)

(72) Inventor: Jeffrey L. George, Saint Charles, IL (US)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/664,540

(22) Filed: Jul. 31, 2017

(65) Prior Publication Data
US 2019/0032741 A1    Jan. 31, 2019

(51) Int. Cl.
| | | |
|---|---|---|
| *F16F 1/36* | (2006.01) | |
| *F16F 1/38* | (2006.01) | |
| *F16F 1/40* | (2006.01) | |
| *F16C 27/06* | (2006.01) | |
| *F16C 11/08* | (2006.01) | |
| *F16F 1/373* | (2006.01) | |
| *F16F 1/374* | (2006.01) | |
| *F16F 3/10* | (2006.01) | |
| *B64C 27/58* | (2006.01) | |
| *B64C 27/32* | (2006.01) | |

(52) U.S. Cl.
CPC ............ *F16F 1/373* (2013.01); *F16C 11/083* (2013.01); *F16C 27/063* (2013.01); *F16F 1/374* (2013.01); *F16F 1/38* (2013.01); *F16F 3/10* (2013.01); *B64C 27/32* (2013.01); *B64C 27/58* (2013.01)

(58) Field of Classification Search
CPC .......... F16F 1/373; F16F 1/3713; F16F 1/374; F16F 1/393; F16F 1/14; F16F 1/38; F16F 3/10; F16C 11/083; F16C 17/22; F16C 23/045; F16C 27/063; F16C 27/084; B64C 27/58; B64C 27/32; B32B 37/185; B32B 37/226
USPC ...... 384/215, 221–222, 626–627; 267/141.1, 267/140.2, 140.4, 282, 294; 416/134 A; 403/225
See application file for complete search history.

(56) References Cited

U.S. PATENT DOCUMENTS

| | | | | |
|---|---|---|---|---|
| 3,071,422 A | * | 1/1963 | Hinks | ..................... F16C 33/26 267/282 |
| 3,467,353 A | * | 9/1969 | Peterson | ................... F16F 1/38 138/143 |

(Continued)

*Primary Examiner* — Marcus Charles
(74) *Attorney, Agent, or Firm* — Mark Ussai; SKF USA Inc. Patent Dept.

(57) ABSTRACT

A component of a laminated bearing assembly is for movably coupling an inner member and an outer member, the inner member having a central axis and the outer member having a bore. The component includes a laminated body disposeable within the outer member bore and having an inner radial end connectable with the inner member and an outer radial end connectable with the outer member. The body is formed of a plurality of alternating, generally arcuate elastomeric and metallic laminae nested generally about the central axis, each one of the elastomeric and metallic laminae having opposing first and second arcuate ends and inner and outer circumferential surfaces extending circumferentially between the first and second arcuate ends. Each metallic lamina has a radial thickness varying circumferentially between a first value at the first, radially-widest arcuate end and a second, lesser value at the second, radially-narrowest arcuate end.

20 Claims, 15 Drawing Sheets

(56) References Cited

U.S. PATENT DOCUMENTS

| | | | | |
|---|---|---|---|---|
| 3,679,197 | A * | 7/1972 | Schmidt | B60G 5/053 267/152 |
| 4,063,787 | A * | 12/1977 | Bakken | F16F 1/3935 267/282 |
| 4,286,827 | A * | 9/1981 | Peterson | F16C 27/063 267/141.1 |
| 4,419,398 | A * | 12/1983 | Coffy | B64C 27/35 267/152 |
| 4,764,152 | A * | 8/1988 | Jorg | F16D 3/76 464/87 |
| 4,765,758 | A * | 8/1988 | O'Donnell | B64C 27/35 267/141.1 |
| 5,092,738 | A * | 3/1992 | Byrnes | B64C 27/51 416/134 A |
| 5,460,487 | A * | 10/1995 | Schmaling | B64C 27/35 267/140.2 |
| 5,601,408 | A * | 2/1997 | Hunter | B64C 27/35 267/141.1 |
| 6,726,394 | B2 * | 4/2004 | Garnier | B61F 5/24 403/132 |
| 6,848,886 | B2 * | 2/2005 | Schmaling | B64C 27/35 416/134 A |
| 7,290,985 | B2 * | 11/2007 | James | B64C 27/56 416/1 |
| 8,632,062 | B2 * | 1/2014 | James | B64C 27/35 267/140.2 |
| 8,911,153 | B2 * | 12/2014 | Cunningham | B64C 27/35 267/282 |
| 9,068,621 | B1 * | 6/2015 | Halladay | F16C 27/02 |
| 9,334,048 | B2 * | 5/2016 | Burnett | F16F 1/41 |
| 9,709,089 | B2 * | 7/2017 | Bohm | B64C 13/30 |
| 2009/0162201 | A1 * | 6/2009 | Cunningham | B64C 27/35 416/134 A |
| 2016/0091017 | A1 * | 3/2016 | Mueller | F16C 17/22 384/125 |

* cited by examiner

ELASTOMERIC BEARING COMPONENT WITH WEDGE-SHAPED SHIMS

BACKGROUND OF THE INVENTION

The present invention relates to bearings, and more particularly to laminated elastomeric bearings used in applications such as helicopter rotors.

Laminated elastomeric bearings are known and include a plurality of alternating, nested elastomeric and metallic layers disposed generally coaxially about a centerline. Such bearings permit movement of a component, such as a centering pin of a feathering hinge, to pivot or "twist" about the bearing centerline and/or to pivot partially about one or more axes generally perpendicular to the centerline. Such bearings are effective in applications such as supporting twisting of a tail rotor shaft or the feathering hinge of a rotor assembly, but may experience premature failure of the elastomeric layers in certain sections of the bearing which experience relatively greater amounts of tensile or shear loading.

SUMMARY OF THE INVENTION

In one aspect, the present invention is a component of a laminated bearing assembly for movably coupling an inner member with an outer member, the outer member having a bore. The bearing component comprises a laminated body disposeable within the outer member bore and having an inner radial end connectable with the inner member and an outer radial end connectable with the outer member. The body is formed of a plurality of alternating, generally arcuate elastomeric and metallic laminae nested generally about a central axis, each one of the elastomeric and metallic laminae having opposing first and second arcuate ends and inner and outer circumferential surfaces extending circumferentially between the first and second arcuate ends. Each metallic lamina has a radial thickness varying circumferentially between a first value at the first, radially-widest arcuate end and a second, lesser value at the second, radially-narrowest arcuate end.

In another aspect, the present invention is a laminated bearing assembly for movably coupling an inner member with an outer member, the inner member having a central axis and the outer member having a bore. The bearing assembly comprises at least two laminated bearing components each being disposeable at least partially within the outer member bore and having an inner radial end connectable with the inner member, so as to be spaced apart about the central axis, and an outer radial end connectable with the outer member. Each bearing component includes a laminated body formed of a plurality of alternating, generally arcuate elastomeric and metallic laminae nested generally about a central axis, each one of the elastomeric and metallic laminae having opposing first and second arcuate ends and inner and outer circumferential surfaces extending circumferentially between the first and second arcuate ends. Each metallic lamina is generally wedge-shaped and has a radial thickness varying circumferentially between a first value at the first, radially-widest arcuate end and a second, lesser value at the second, radially-narrowest arcuate end.

In a further aspect, the present invention is a mechanical assembly comprising an inner member having a central axis and an outer member having a bore, at least one of the inner and outer members being angularly displaceable about the central axis. At least one laminated body is disposed within the outer member bore and has an inner radial end connected with the inner member and an outer radial end connected with the outer member. The body is formed of a plurality of alternating, generally arcuate elastomeric and metallic laminae nested generally coaxially about a central axis, each one of the elastomeric and metallic laminae having opposing first and second arcuate ends and inner and outer circumferential surfaces extending circumferentially between the first and second arcuate ends. Each metallic lamina is generally wedge-shaped and has a radial thickness varying circumferentially between a first value at the first, radially-widest arcuate end and a second, lesser value at the second, radially-narrowest arcuate end.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 8:
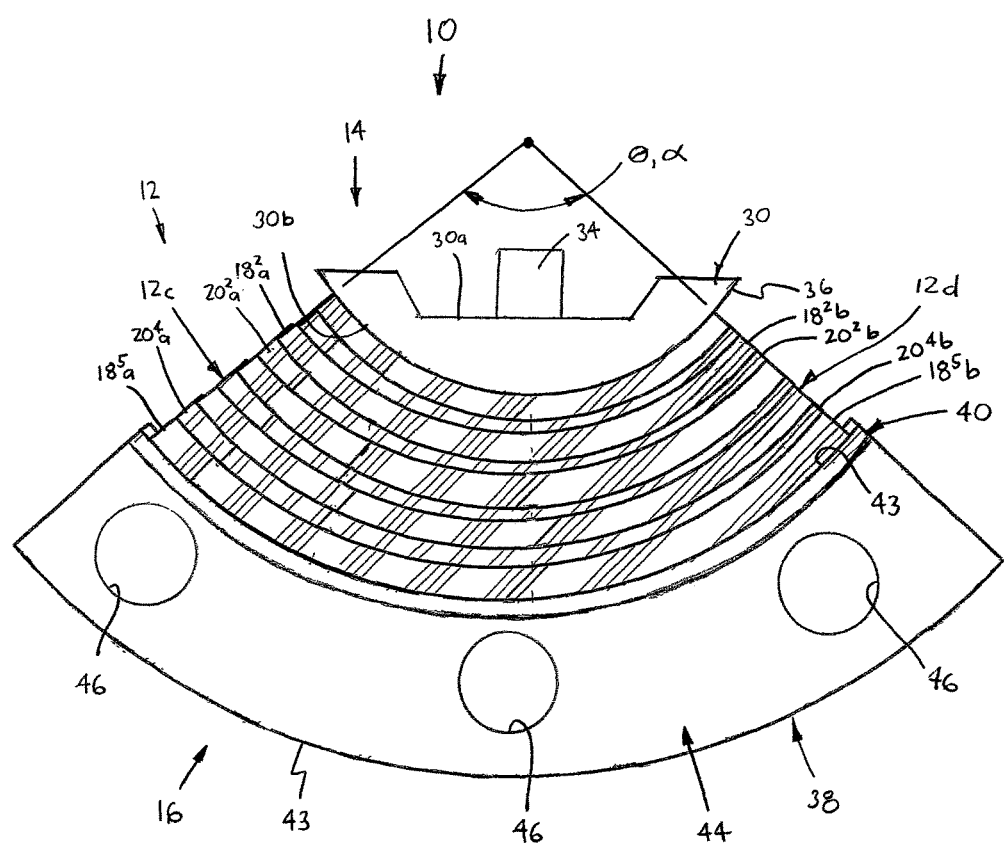
FIG. 8 is a top plan view of the first bearing construction, showing another exemplary structure of inner and outer connectors.
Figure 9:
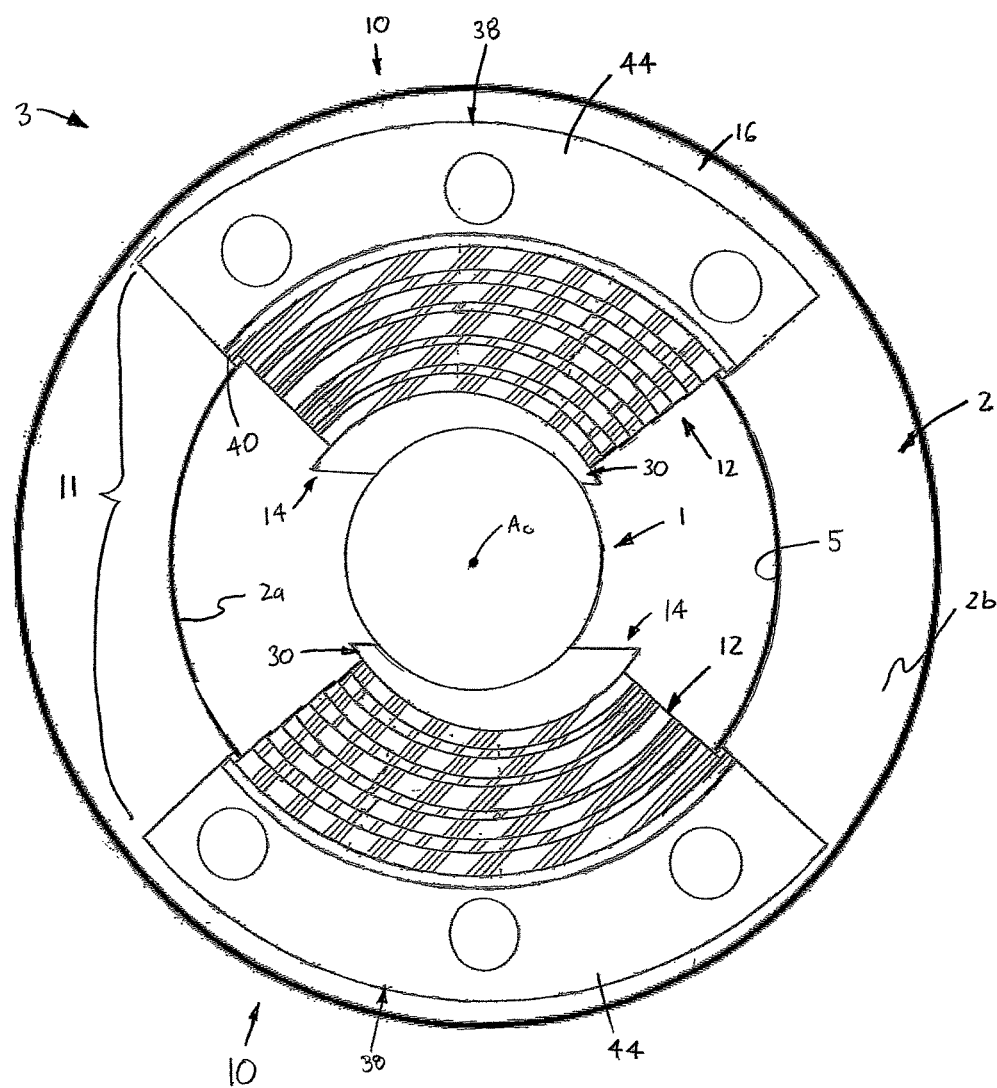
FIG. 9 is a top plan view of a bearing assembly formed of two of the first construction bearing components and showing inner and outer members.
Figure 10:
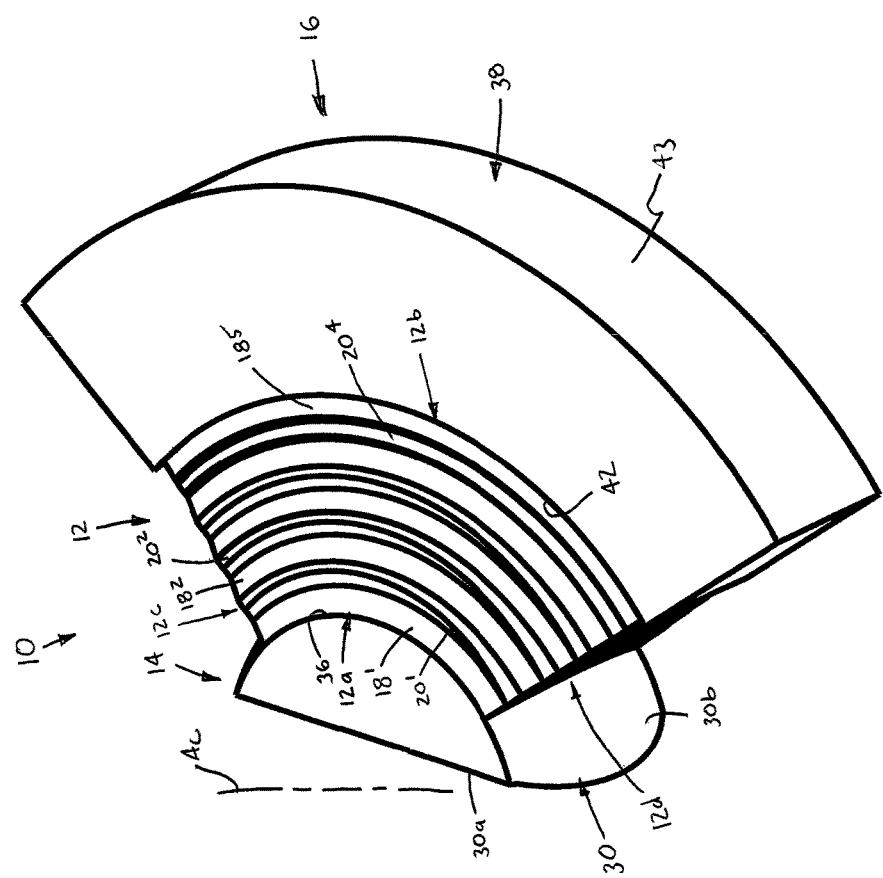
FIG. 10 is perspective view of a second construction of the bearing component in accordance with the present invention.

Referring now to the drawings in detail, wherein like numbers are used to indicate like elements throughout, there is shown in FIGS. 1-18 a component 10 of a laminated bearing assembly 11 for movably coupling a central, inner member 1 with an outer member 2 of a mechanical assembly 3, the outer member 2 having a bore 5 (see FIG. 9). Preferably, the inner and outer members 1, 2 are components of rotary aircraft hub and blade assembly, such as for example, a tail rotor shaft and a housing attached to an airframe (not shown), but may be used to support any relatively movable inner and outer members 1, 2 beyond rotary aircraft. The bearing component 10 basically comprises a laminated body 12 disposeable within the outer member bore 5, the body 12 having an inner and outer radial ends 12a, 12b and opposing first and second circumferential sides 12c, 12d, respectively, and preferably includes inner and outer connectors 14, 16, respectively. The body inner radial end 12a is connectable with the inner member 1, preferably by means of the inner connector 14, and the body outer radial end 12b is connectable with the outer member 2, preferably by means of the outer connector 16.

Figure 4:
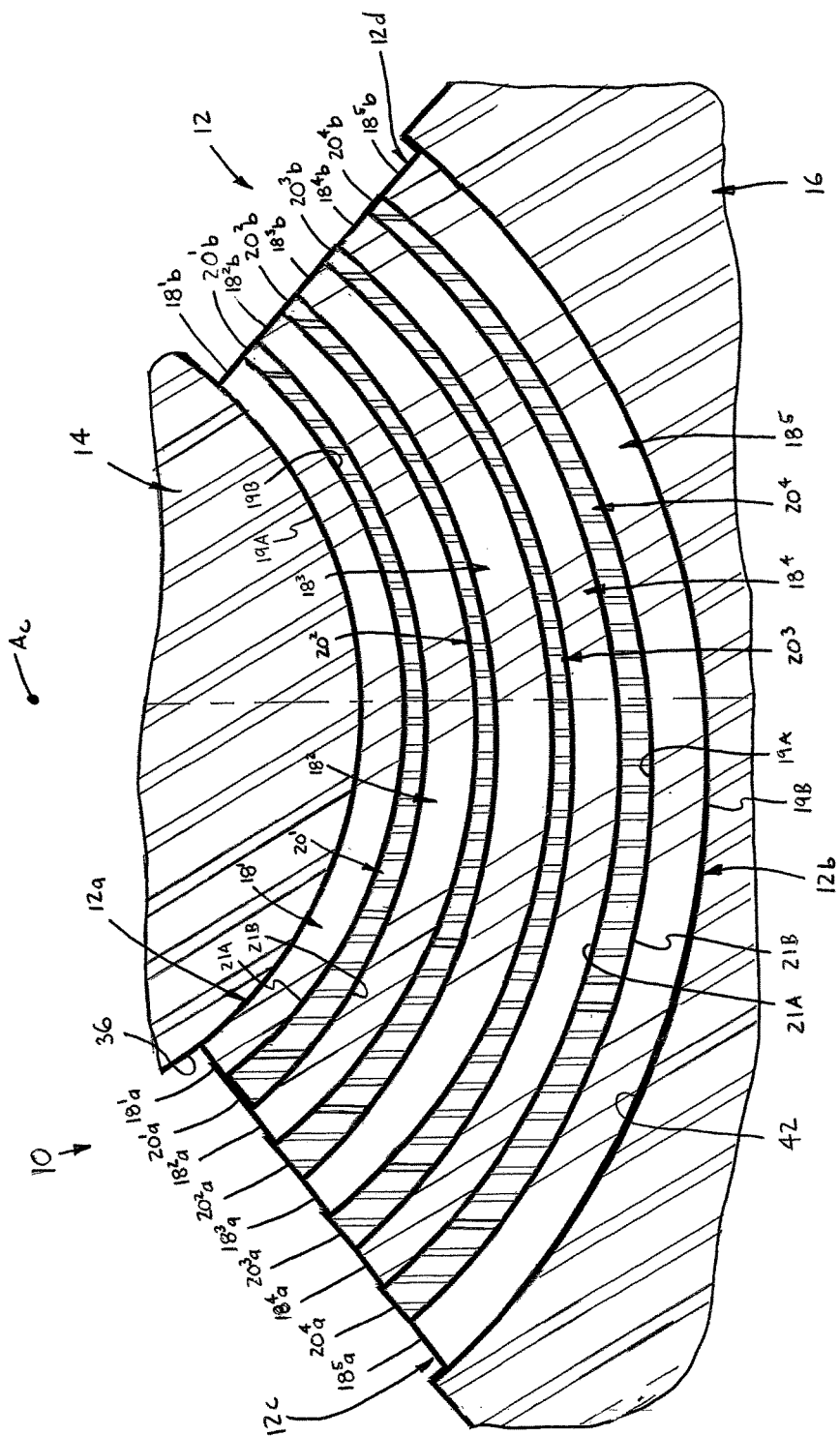
FIG. 4 is an enlarged view of a portion of FIG. 3.
Figure 5:
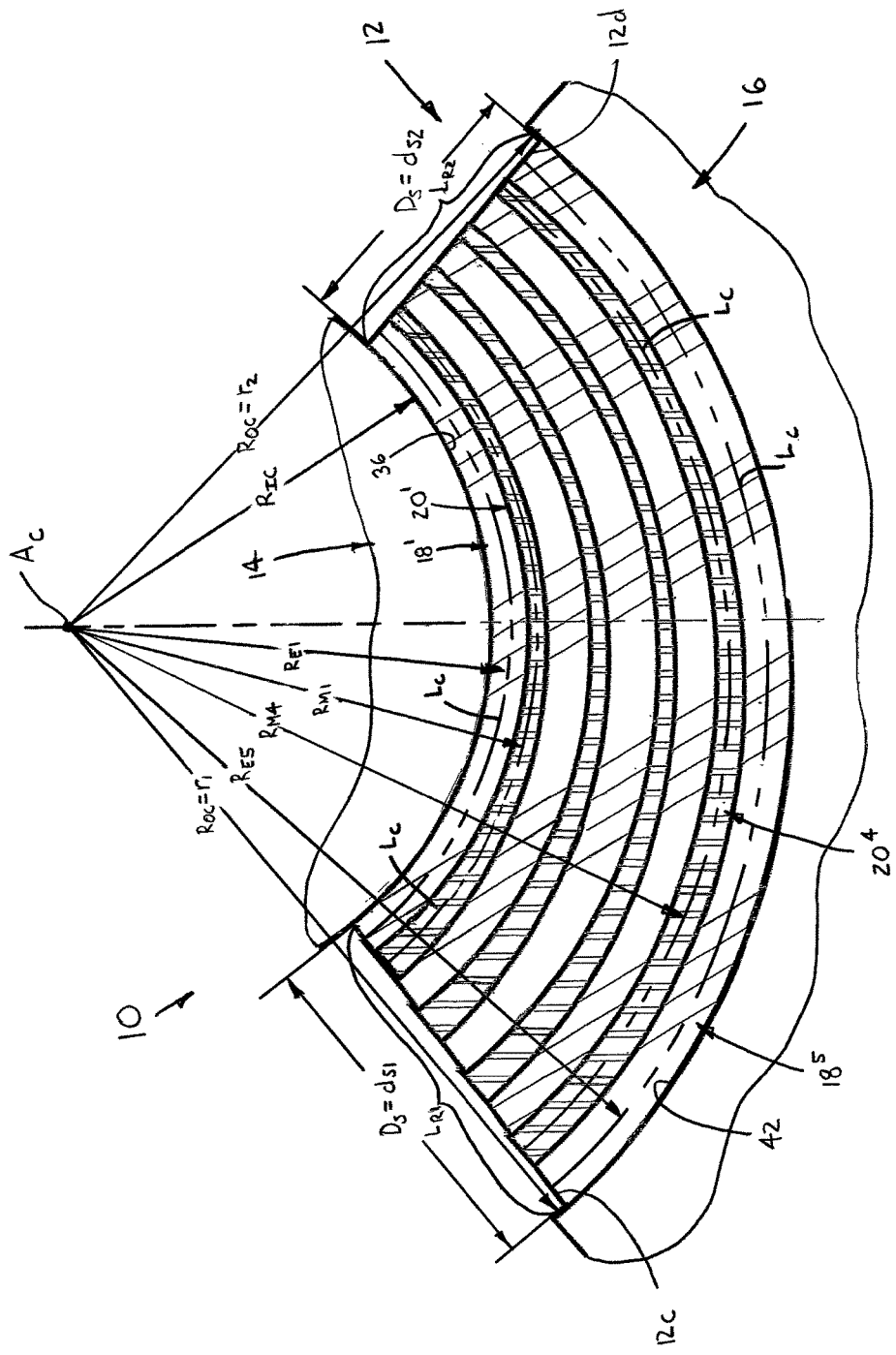
FIG. 5 is another enlarged view through a portion of FIG. 3.
Figure 6:
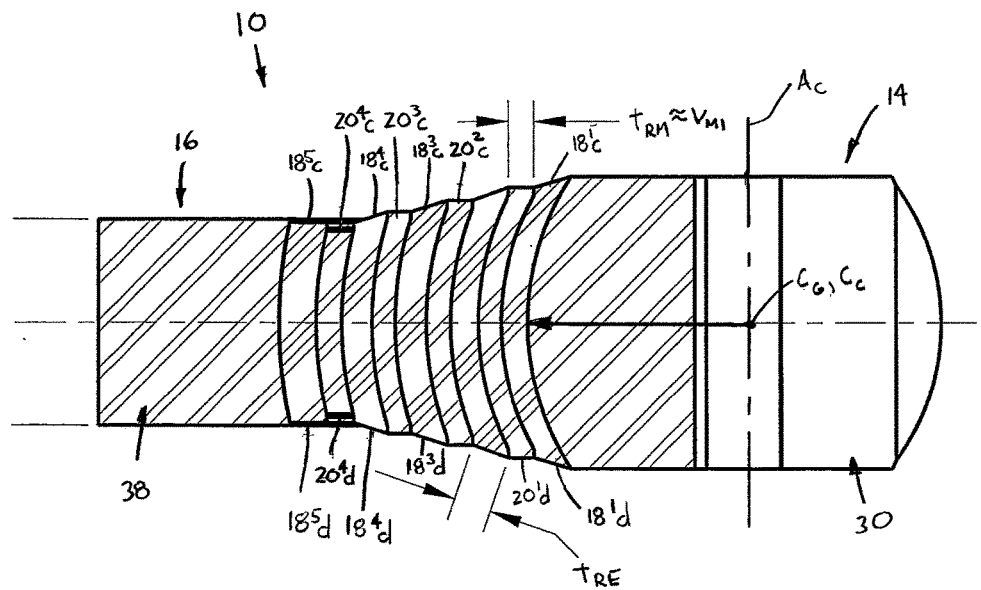
FIG. 6 is an axial cross-sectional view through line 6-6 of FIG. 3.
Figure 7:
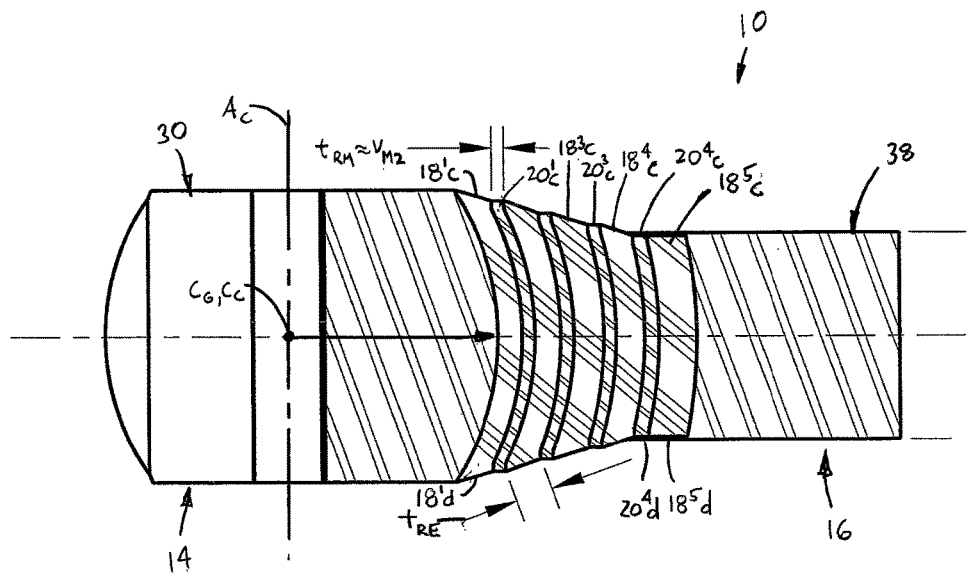
FIG. 7 is an axial cross-sectional view through line 7-7 of FIG. 3.
Figure 13:
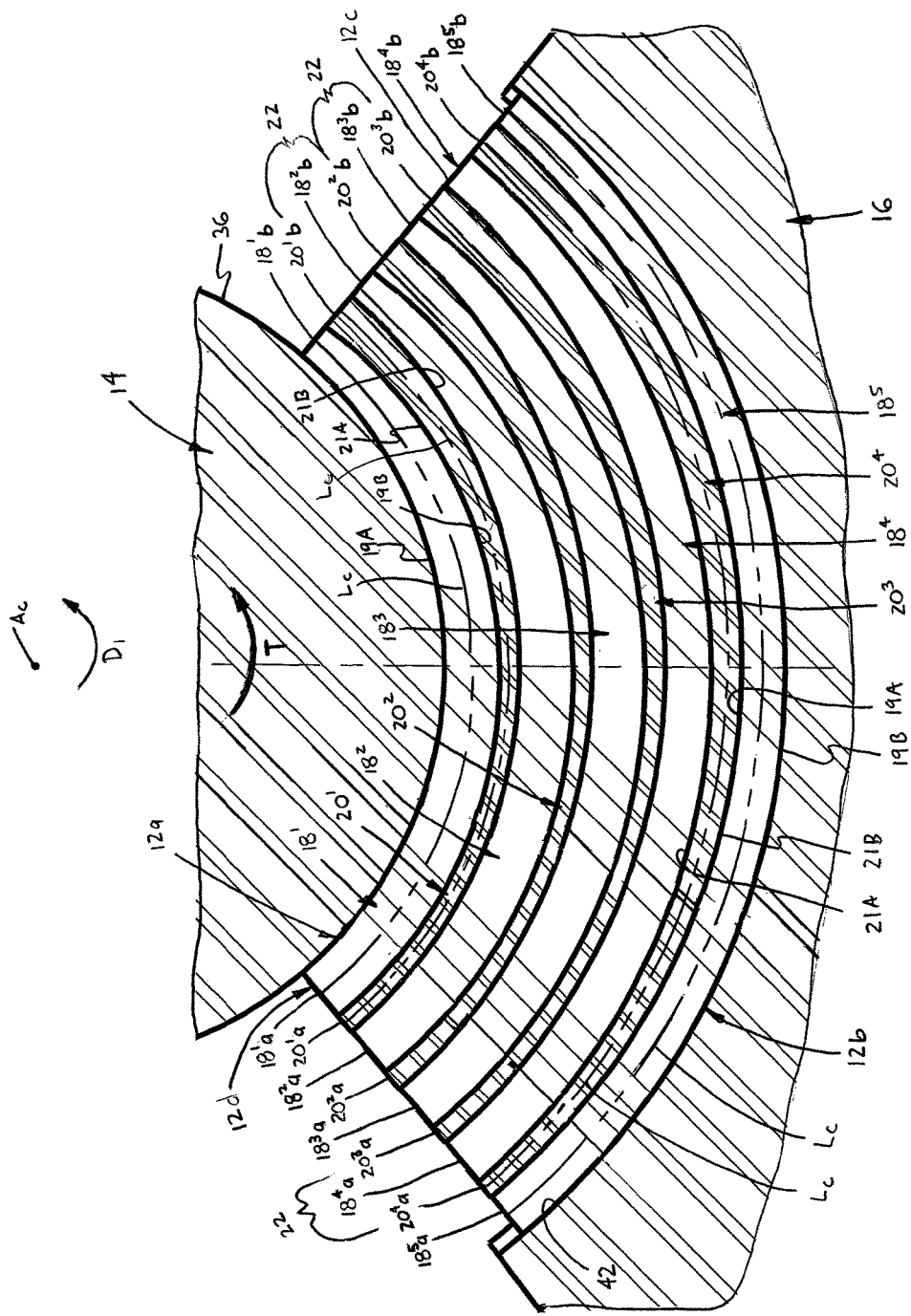
FIG. 13 is an enlarged view of a portion of FIG. 12.
Figure 14:
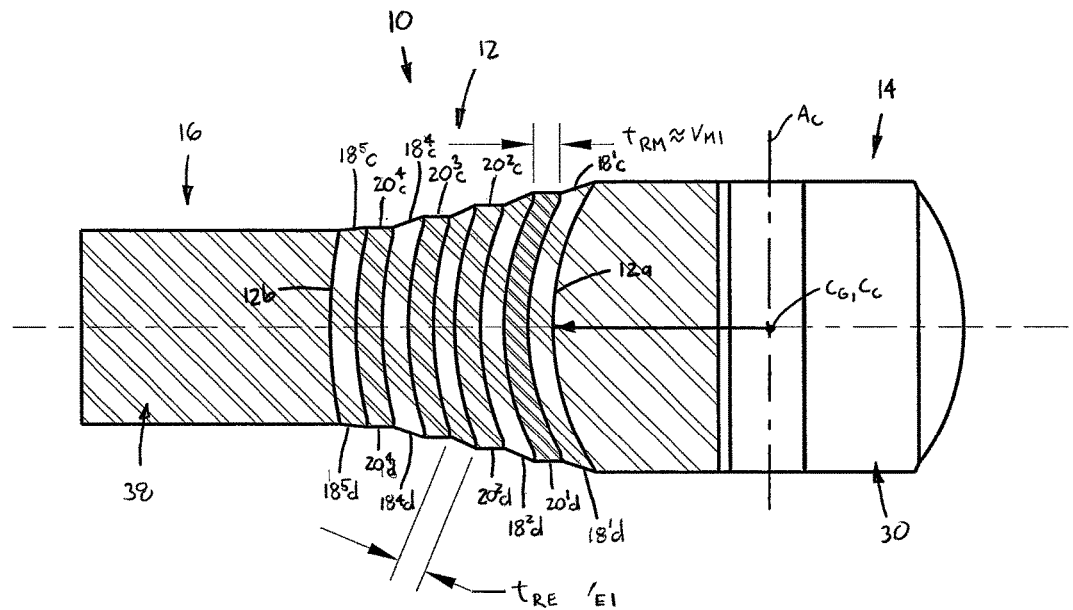
FIG. 14 is an axial cross-sectional view through line 14-14 of FIG. 12.
Figure 15:
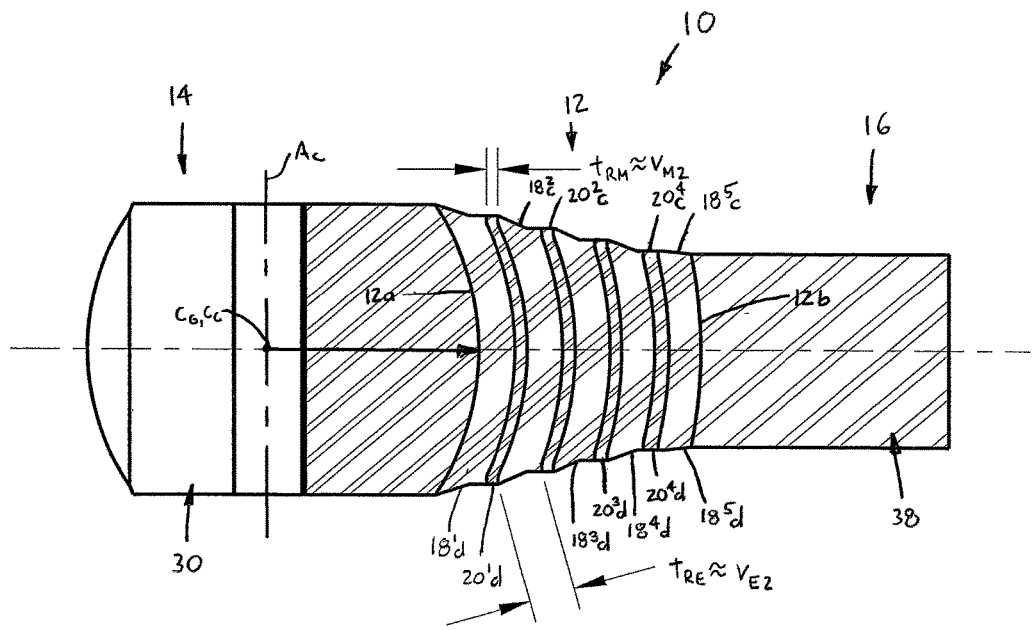
FIG. 15 is an axial cross-sectional view through line 15-15 of FIG. 12.

The laminated body 12 is formed of a plurality of alternating, generally arcuate elastomeric and metallic laminae $18''$, $20''$, respectively, nested generally about a central axis $A_C$. That is, the laminae $18''$, $20''$ alternate from a first, radially innermost elastomeric lamina $18^1$, a first, radially-innermost metallic lamina $20^1$ spaced radially outwardly from and attached to the first elastomeric lamina $18^1$, a second elastomeric lamina $18^2$ spaced radially outwardly from and attached to the first metallic lamina $20^1$, etc., a second metallic lamina $20^2$ spaced radially outwardly from and attached to the second elastomeric lamina $18^2$, etc., as indicated in FIGS. 4 and 13. Also, with the nested laminae $18''$, $20''$, the radial dimension $R_{En}$, $R_{Mn}$, of each lamina $18''$, $20''$ respectively, generally increases in a direction outwardly from the central axis $A_C$, as indicated in FIG. 5. Preferably, the elastomeric laminae $18''$ are formed of materials of differing stiffnesses, such that the innermost lamina $18^1$ has the greatest stiffness and the outermost lamina $18''$, for example $18^5$ as depicted, has the lowest or least stiffness. However, the elastomeric laminae $18''$ may each have the same stiffness or stiffnesses that vary in any desired manner.

Figure 12:
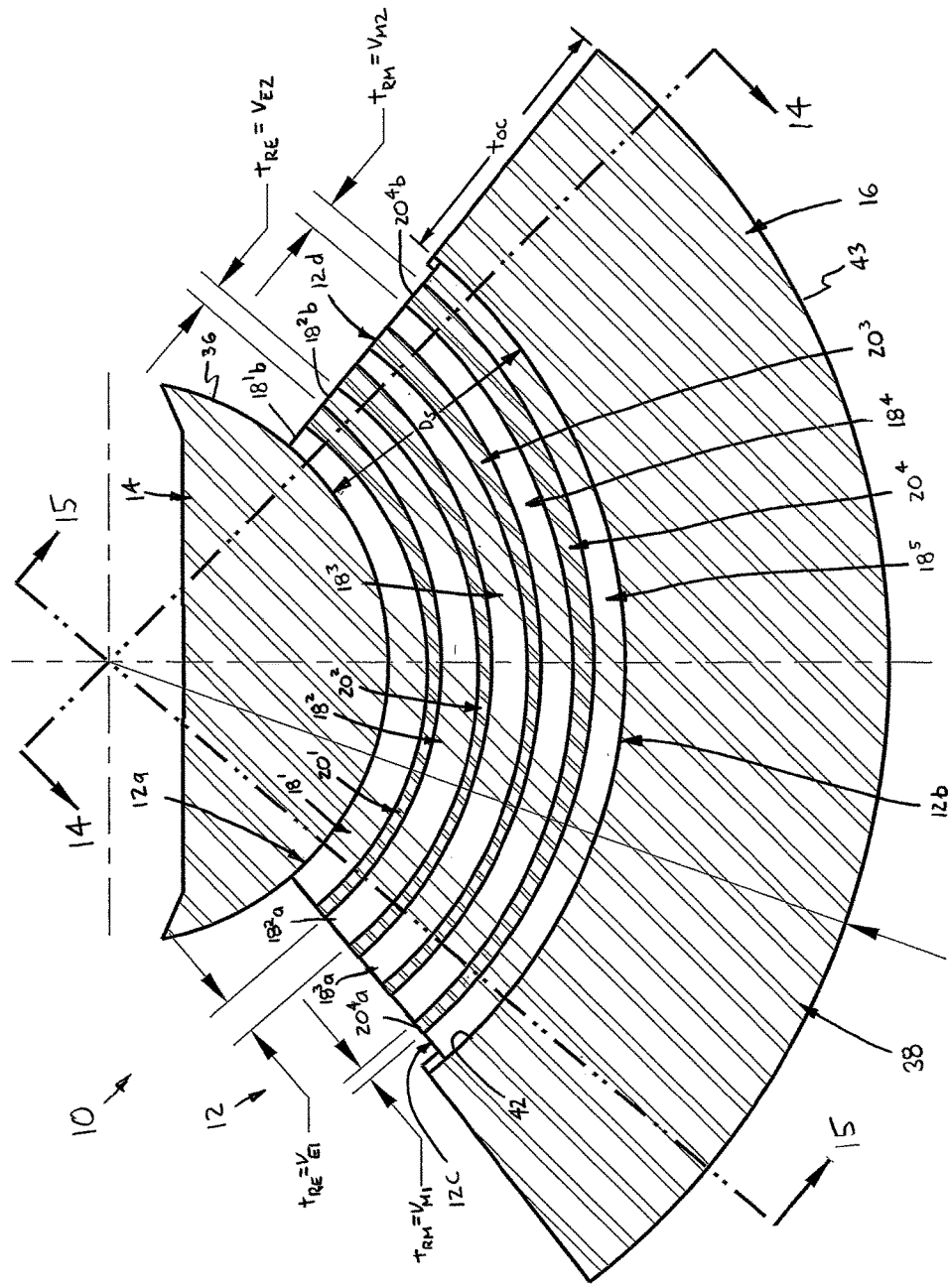
FIG. 12 is a radial cross-sectional view through line 12-12 of FIG. 11.

Each one of the elastomeric and metallic laminae $18''$, $20''$ has opposing first and second arcuate ends $18''a$, $18''b$ and $20''a$, $20''b$, respectively, and a circumferential length $L_C$ extending between the first and second arcuate ends $18''a$, $18''b$ or $20''a$, $20''b$. Each lamina $18''$ or $20''$ also has inner and outer circumferential surfaces 19A, 19B and 21A, 21B, respectively, extending circumferentially between the first and second arcuate ends $18''a$, $18''b$ and $20''a$, $20''b$, and opposing axial ends $18''c$, $18''d$ and $20''c$, $20''d$, respectively, spaced apart generally along the central axis $A_C$. Further, each metallic lamina or "shim" $20''$ is generally wedge-shaped and has a radial thickness $t_{RM}$ that "tapers" or varies circumferentially, and preferably linearly directly, between a first value $v_{M1}$ at the first, radially-widest arcuate end $20''a$ and a second, lesser value $v_{M2}$ at the second, radially-narrowest arcuate end $20''b$, as indicated in FIGS. 3 and 12.

In a first, presently preferred construction shown in FIGS. 1-9 and 16, each elastomeric lamina $18''$ is formed so to have a substantially constant radial thickness $t_{RE}$ between the first and second arcuate ends $18''a$, $18''b$. With varying thickness metallic laminae/shims $20''$ nested with/between generally constant thickness elastomeric lamina $18''$, the laminated body 12 is formed such that the first circumferential side 12c has a first radial length $L_{R1}$ that is substantially greater than a second radial length $L_{R2}$ of the body second circumferential side 12d, as indicated in FIGS. 3, 5, 12 and 13. Specifically, the greater radial length $l_{R1}$ at the body first side 12c, and thus the greatest spacing distance $d_{S1}$ between the inner and outer connectors 14, 16, is due to the stack up of all of the radially-widest arcuate ends $20''a$ of the metallic laminae $20''$. Conversely the shorter radial length $L_{R2}$ at the body second side 12d, and the smallest or least spacing distance $d_{S2}$ between the connectors 14, 16, results from the aggregate of all of the radially-narrowest arcuate ends $20''b$ of the metallic laminae/shims 20.

Figure 1:
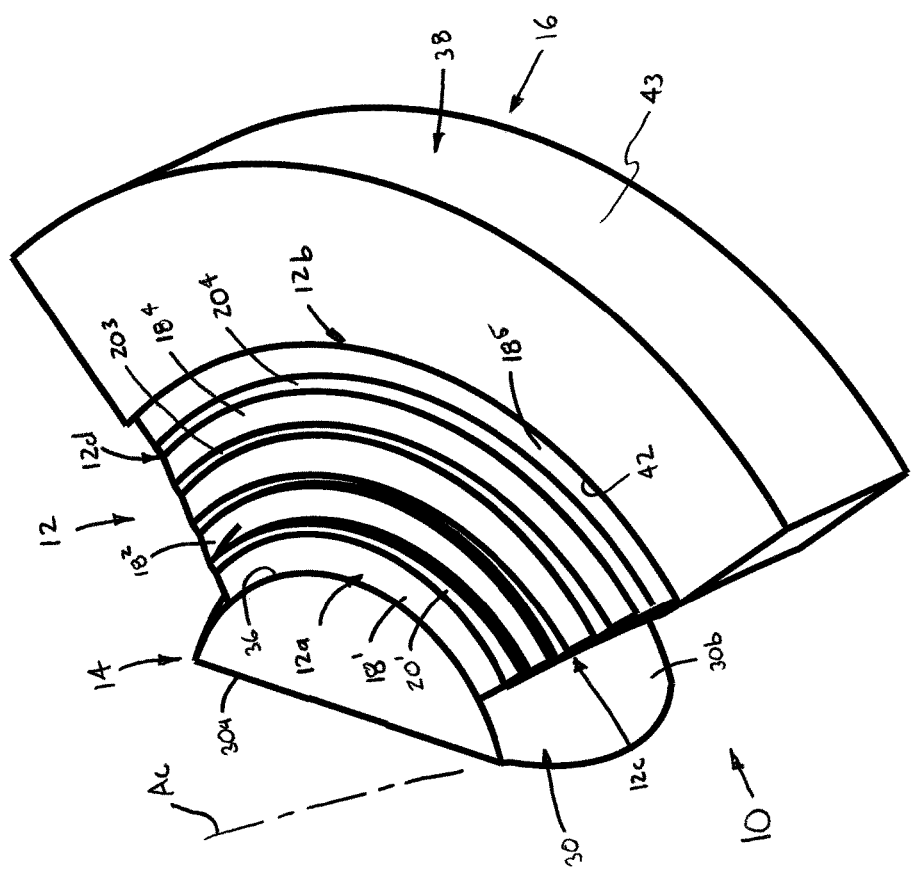
FIG. 1 is perspective view of a first construction of a bearing component in accordance with the present invention.
Figure 2:
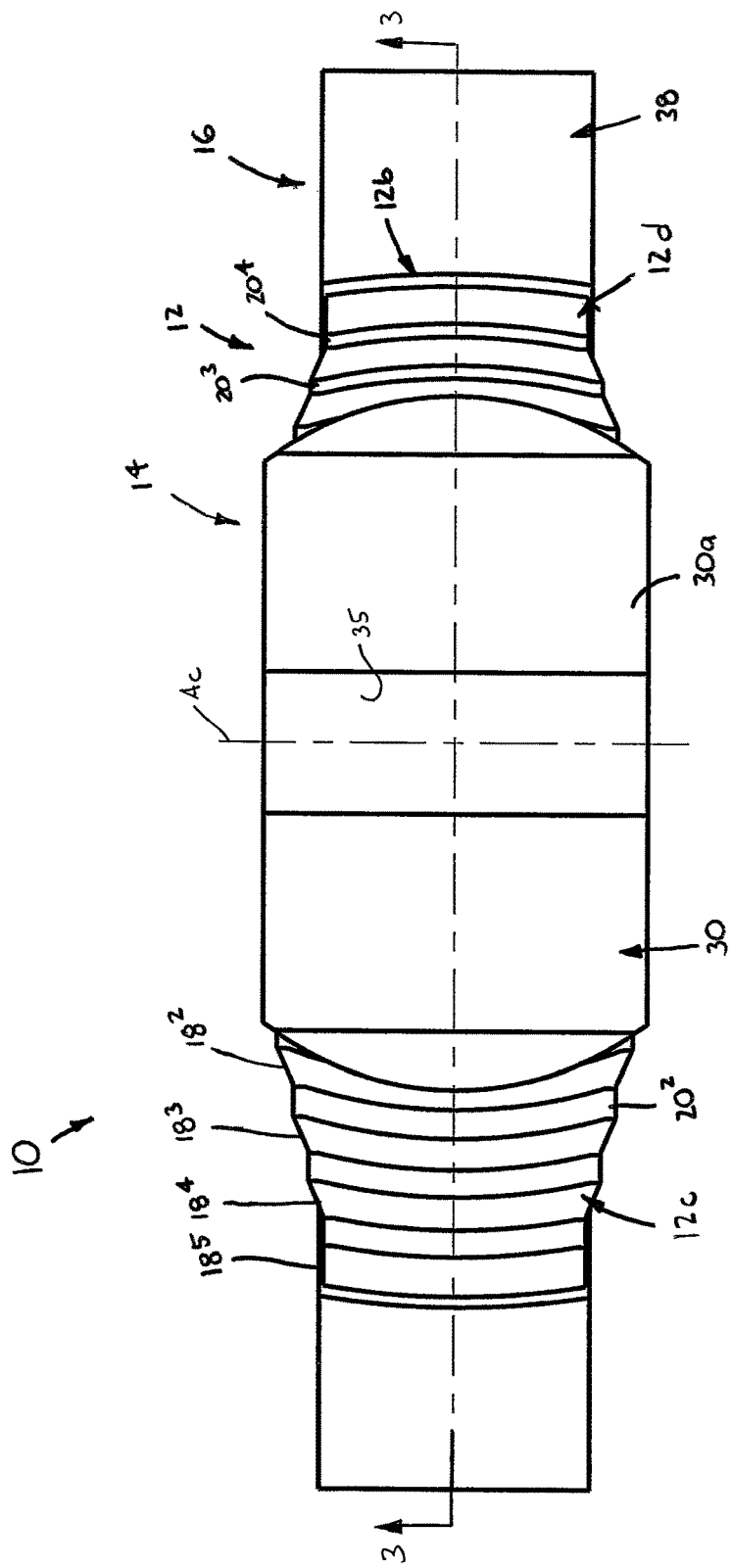
FIG. 2 is a front plan view of the first construction bearing component.
Figure 3:
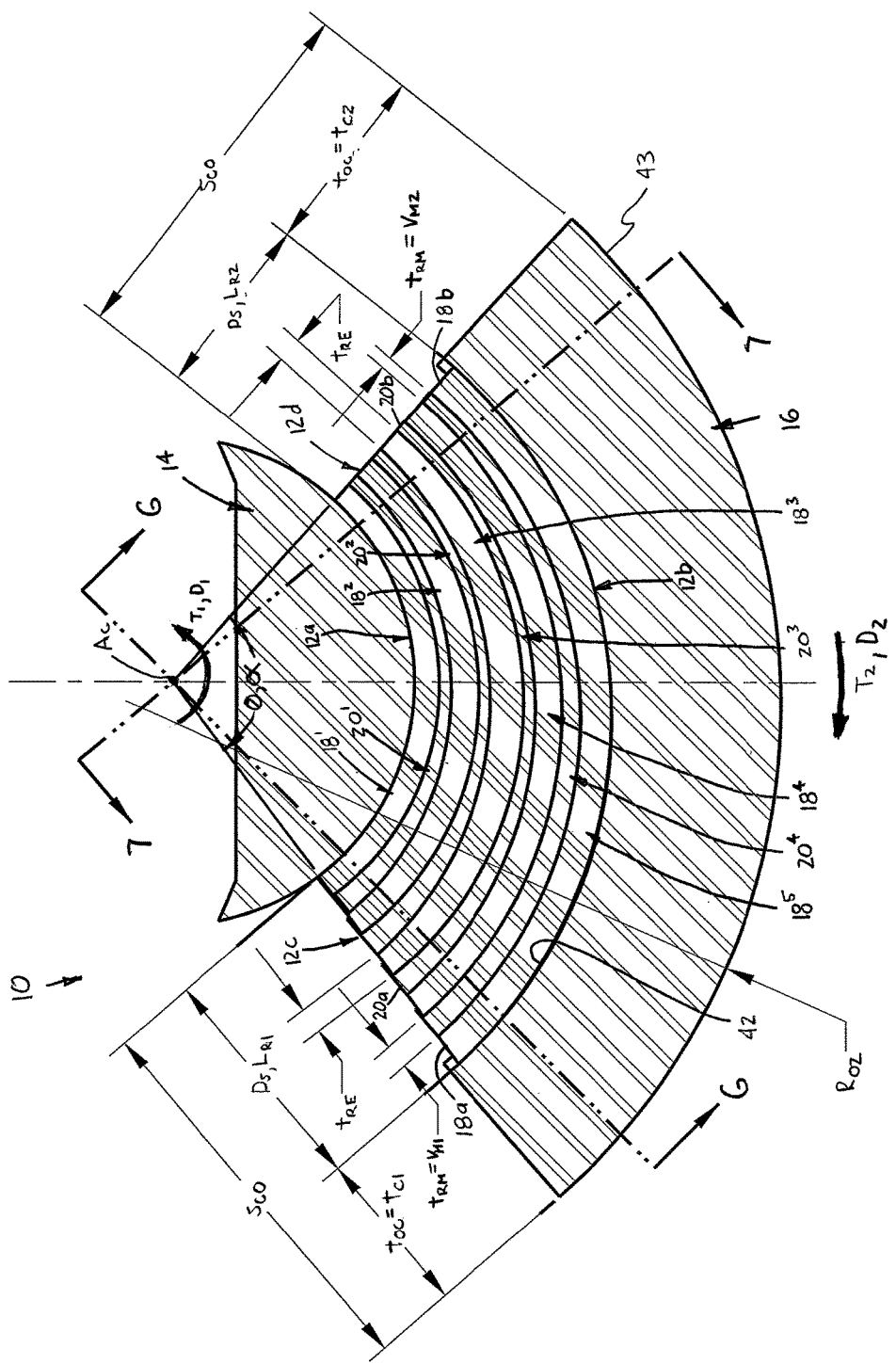
FIG. 3 is a radial cross-sectional view through line 3-3 of FIG. 2.

Referring to FIGS. 3 and 5, with such a laminated body structure, the inner connector 14 preferably has an outer surface 36 with a generally constant radius $R_{IC}$ about the central axis $A_C$ and the outer connector 16 has an inner surface 42 with radius $R_{OC}$ about the central axis $A_C$ that varies between a first value $r_1$ proximal to the laminated body first circumferential side 12c and a second, lesser value $r_2$ proximal to the laminated body second circumferential side 12d, as indicated in FIG. 5. As such, a spacing distance $D_S$ between the inner connector 14 and the outer connector 16 has a first value $d_{s1}$ at the laminated body first circumferential side 12c and a second, lesser value $d_{s2}$ at the laminated body second circumferential side 12c. In other words, the spacing between the inner and outer components 14, 16 is substantially greater at the body first circumferential side 12c as compared with the spacing at the second circumferential side 12d. Further, the outer connector 18 is preferably formed having a tapering radial thickness $t_{OC}$, opposite the taper direction of the shims $20''$, so that the connector outer surface 43 is generally centered about the central axis $A_C$, i.e., has a radius $R_{O2}$ with a constant value about the axis $A_C$, and such that a spacing distance $S_{CO}$ between the inner connector outer surface 36 and the outer connector outer surface 43 is also generally constant (see FIG. 3). Specifically, the outer connector thickness $t_{OC}$ increases from a first, lesser value $t_{C1}$ generally adjacent to the laminated body first side 12c to a second, greater value $t_{C2}$ generally adjacent to the body second side 12d, as indicated in FIG. 3.

As a result of the wedge-shaped metallic shims $20''$ and the differences in the spacing distance $d_{S1}$, $d_{S2}$ at each body side 12c, 12d, respectively, caused thereby, the total deflection of the elastomeric laminae $18''$ is decreased in comparison to conventional laminated bearings and at least a substantial portion of each elastomeric lamina $18''$ remains in compression instead of tension, when loading is applied to the bearing component 10 in a specified manner. Specifically, when a torque $T_1$ is applied to the inner member 1 in a first, counter-clockwise direction $D_1$, the "front end" portion of each elastomeric lamina 18 extending inwardly from the lamina first end 18"a is deflected toward the body side 12d having the least spacing distance $d_{S2}$, compressing each elastomeric laminae 18" between adjacent metallic shims 20" to reduce tensile-loading and/or increase compression on each elastomeric lamina frontend portion, as indicated in FIG. 3. Conversely, when a torque $T_2$ is applied to the outer member 2 in a second, clockwise direction $D_2$, the backend portion of each elastomeric lamina 18" extending inwardly from the lamina second end 18"b is deflected toward portions of the two adjacent metallic laminae 20 having increasing thickness $t_M$, which thereby induces compression on those portion(s) of each lamina 18" normally tending to be pulled or stretched into tensile loading, as also indicated in FIG. 3.

Referring to FIGS. 10-15, in a second bearing component construction, each elastomeric lamina 18" has a radial thickness $t_{RE}$ varying circumferentially, preferably linearly directly, between a first value $v_{E1}$ at the first, radially-widest arcuate end 18"a and a second, lesser value $v_{E2}$ at the second, radially-narrowest arcuate end 18"b, i.e., $v_{E1} > v_{E2}$, as indicated in FIG. 12. With such a varying elastomeric lamina thickness $t_{RE}$, the elastomeric laminae 18" and the metallic laminae 20" are preferably arranged such that the radially-narrowest end 18"b of each one of at least a portion of the elastomeric laminae 18" is disposed generally between the radially-widest ends 20"b of two adjacent metallic laminae 20", and vice-versa. Preferably, the laminae 18", 20" are sized such that the radial length $L_R$ (not indicated) at each body side end 12c, 12d, and thus the spacing distance $D_S$ (FIG. 12) between the inner and outer connectors 14, 16, is substantially equal or constant. As such, the outer connector 16 preferably has a generally constant radial thickness $t_{OC}$ between the inner and outer surfaces 42, 43, which are both generally centered about the central axis $A_C$. However, either or both of the inner and outer connectors 14, 16 may be formed having a varying radial thickness $t_{IC}$, $t_{OC}$ when used with laminae 18", 20" formed so that the spacing distance $D_S$ is substantially equal/constant.

With such a lamina structure, at least a portion of the metallic laminae 20 can be considered to be arranged in pairs 22 of adjacent inner and outer metallic laminae 20", as indicated in FIG. 13. In such an arrangement, certain metallic laminae 20" are each an outer lamina 20" in one pair 22 and an inner lamina 20" in an adjacent pair 22 (i.e., except for the innermost lamina $20^1$ and the outermost lamina 20"). In each metallic lamina pair 22, the outer surface 21B of the inner metallic lamina 20" and the inner surface 21A of the outer metallic lamina 20" are generally radially converging in the first, counter-clockwise angular direction $D_1$ about the central axis $A_C$, as indicated in FIG. 13. As such, each one of the elastomeric laminae 18" disposed between a particular pair 22 of metallic laminae 20" is generally compressed against the converging outer and inner circumferential surfaces 21A, 21B when a torque T is applied on the laminated component 10 in the first angular direction $D_1$. Thus, at least a substantial part of the backend portion of each elastomeric lamina 18", extending from the second end 18"b and toward the first end 18"a, is generally in compression as opposed to tension when torsional loading is primarily in the first direction $D_1$ under expected normal operating conditions.

With either bearing component construction, the laminated body 12 formed of the wedge-shaped metallic laminae/shims 20" results in a substantial increase in the life expectancy of the bearing component 10, and thus also the bearing assembly 11, compared to previously known laminated bearings/bearing components. Such an increase is due to the fact that elastomers have greater strength in compression compared with tension. Therefore, by inducing compression (or at least reducing tensile loading) on portions of the elastomeric laminae 18" that would otherwise be in tension or have greater tensile loading results in the increased bearing life expectancy.

Figure 11:
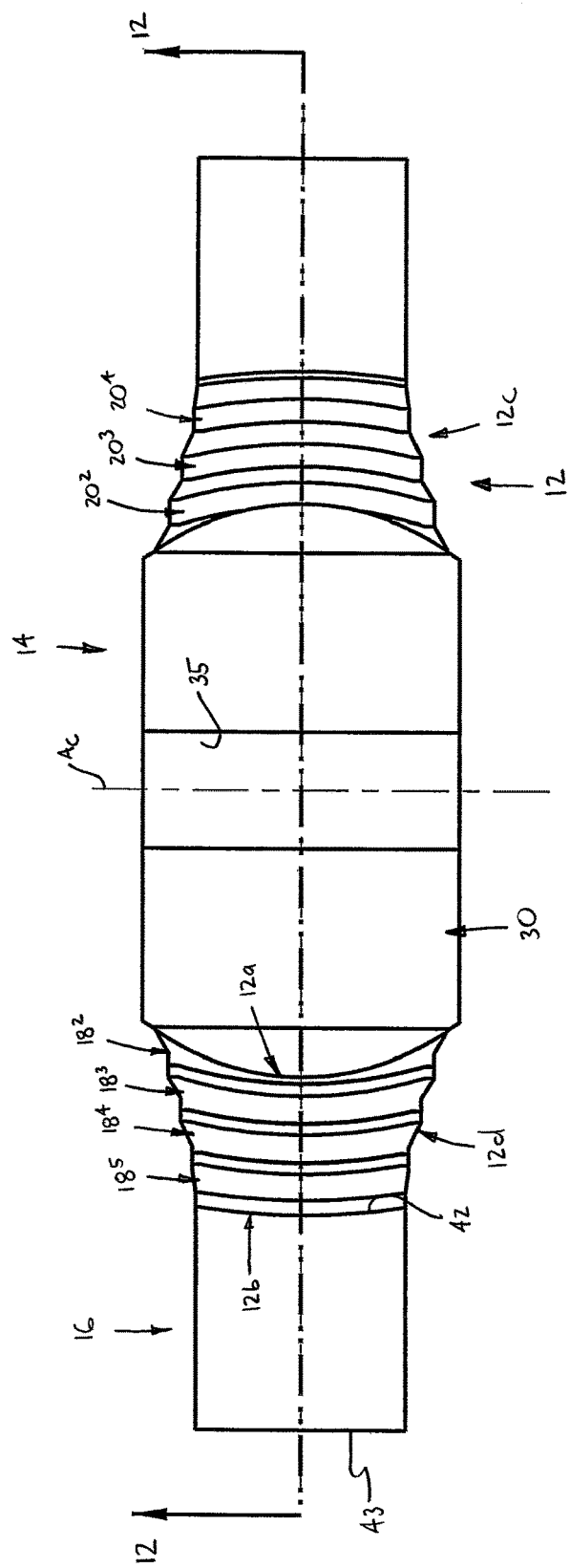
FIG. 11 is a front plan view of the second construction bearing component.
Figure 16:
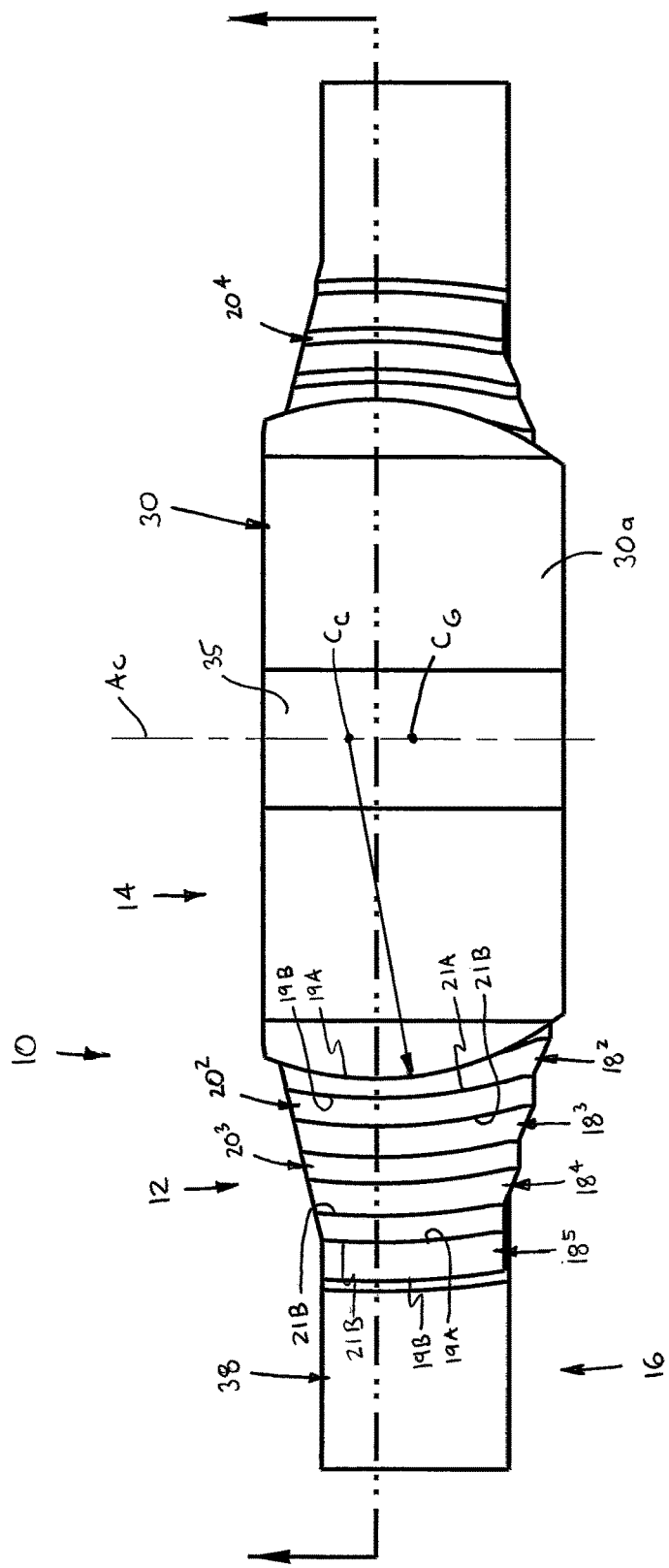
FIG. 16 a front plan view of the first construction bearing component, shown formed in an asymmetric configuration.

Referring now to FIGS. 3, 8 and 12, as discussed above, the inner connector 14 is configured to connect the laminated body inner radial end 12a with the inner member 1 and preferably, includes an at least generally rigid, partially cylindrical body 30, which preferably formed of a metallic material. The inner connector body 30 has a radially inner end 30a connectable with the inner member 1 by any appropriate means, such as for example, by a pin or stub shaft 34 as depicted in FIG. 8 or a socket/opening 35 for receiving a pin/shaft (FIGS. 3, 11, 16). Further, the inner connector body 30 has a curved radially outer end 30b with an outer circumferential surface section 36, the innermost elastomeric lamina $18^1$ being attached to the outer surface 36 by any appropriate means, such as for example, by molding, by means of an adhesive, by one or more fasteners, etc. However, the inner connector 30 may have any other appropriate shape and/or be configured to connect with the inner member 1 or the laminated body 12 by any other appropriate means or structure.

Further, the outer connector member 16 is configured to connect the laminated body outer radial end 12b with the outer member 2 and preferably includes a generally arcuate body 38. As depicted in FIGS. 8 and 9, the outer connector body 38 preferably has an inner ring portion 40 providing the inner circumferential surface 42 and an outer flange portion 44 extending radially outwardly from the ring portion 40, providing the outer surface 43 and having a plurality of openings 46 for receiving fasteners (not shown). The outermost one of the elastomeric laminae 18", for example lamina $18^5$ as depicted, is attached to at least a portion of the outer connector inner surface 42 by any appropriate means, such as by molding, bonding by adhesive, fasteners, etc. to the connector surface 38, bonded to the connector body 38 by an adhesive, etc. Further, the inner ring portion 40 is preferably disposable against an inner circumferential surface 2a defining the outer member bore 3 and the flange portion 44 is disposeable against a mounting surface 2b of the outer member 2 and attached thereto by a plurality of fasteners (e.g., bolts), as indicated in FIG. 9. However, the outer connector 16 may have any appropriate shape and/or be configured to connect with the outer member 2 or the laminated body 12 by any other appropriate means or structure.

Figure 17:
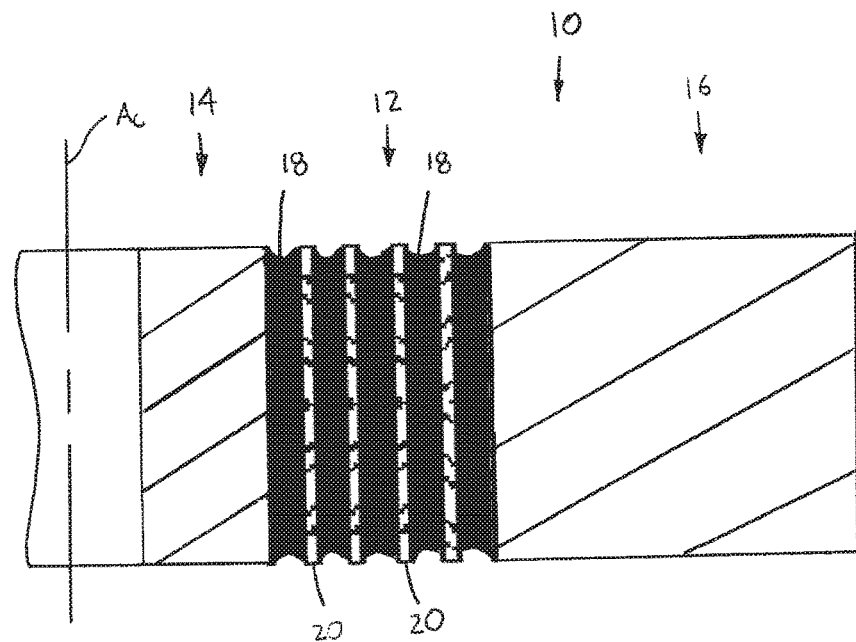
FIG. 17 is an axial cross-sectional view of a bearing component having laminae alternatively formed each with a partially circular cylindrical shape.
Figure 18:
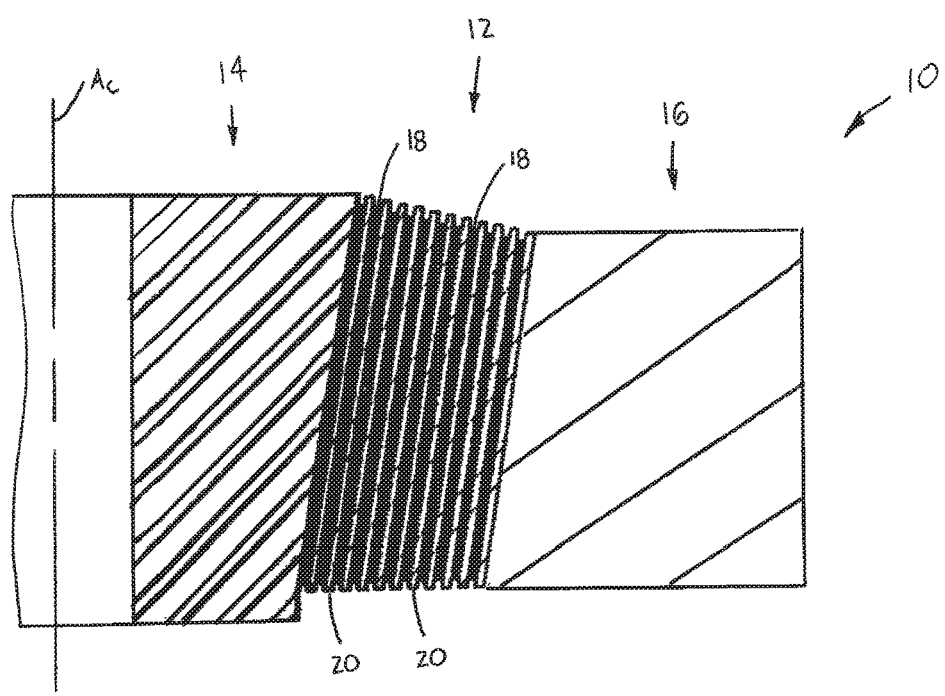
FIG. 18 is an axial cross-sectional view of bearing component having laminae alternatively formed each with a partially conical shape.

Referring to FIGS. 6, 7 and 14-16, preferably, each one of the elastomeric and metallic laminae 18", 20" of the laminated body 12 is preferably generally partially spherical, i.e., is generally shaped as a portion of a sphere, and has a center of curvature $C_C$ located generally on or proximal to the geometric center $C_G$ of the inner connector 14. More specifically, the inner surface 19A, 21A of each one of the elastomeric and metallic laminae 18", 20", respectively, is generally concave and the outer surface 19B, 21B of each one of the elastomeric and metallic laminae 18", 20" is generally convex, as depicted. Alternatively, each of the laminae 18", 20" may be generally straight-walled and either substantially circular cylindrical, as depicted in FIG. 17, or generally conical as shown in FIG. 18. However, any one or all of the laminae 18", 20" may have any other appropriate shape, or combination of different shapes, as desired for a particular application of the component 10 of the laminated bearing assembly 11.

With the preferred spherical laminae 18″, 20″ of the laminated body 12, at least a portion of the inner connector outer surface 36 is partially spherical with a center of curvature (not indicated) located on the geometric center $C_G$. The innermost elastomeric lamina 18¹ is attached to the inner member outer surface 36 such that the centers of curvature $C_C$ of the elastomeric and metallic laminae 18″, 20″ are either generally coincident with, or spaced generally along the central axis $A_C$ from, the center of curvature of the connector outer surface 36. That is, either the laminae 18″, 20″ are generally symmetric about the inner connector 16 (FIGS. 6, 7, 14 and 15) or are asymmetric with respect to the connector 16 (FIG. 16). Such an asymmetric structure provides additional spacing on an opposing side for installation of other components of the mechanical assembly 3 in certain applications and also enables accommodation of an axial preload or static load in a more balanced "in service" loading condition.

Referring to FIGS. 3-5, 8, 12 and 13, the laminae 18″, 20″ of the laminated body 12 are preferably arranged such that the circumferential length $L_C$ of each one of the elastomeric and metallic laminae 18″, 20″ is greater than the circumferential length $L_C$ (FIGS. 5 and 13) of each other lamina 18″, 20″ disposed radially inwardly of the one lamina 18″ or 20″. In other words, the laminae 18″, 20″ are arranged such that the circumferentially "shorter" laminae 18″ or 20″ are disposed radially-inwardly of the circumferentially longer laminae 18″, 20″, such that the laminated body 12 is generally "pie-shaped", but may alternatively have any other appropriate shape as desired. Further, an angle θ is defined between the two arcuate ends 18″a, 18″b or 20″a 20″b of each one of the elastomeric and metallic laminae 18″, 20″, respectively and the central axis $A_C$, as indicated in FIGS. 3 and 8. With the above-described arrangement of the varying circumferential lengths $L_C$ of the laminae 18″, 20″, the angle θ of each one of the elastomeric and metallic laminae 18″, 20″ has a value about equal to the value of the angle θ of each other one of the elastomeric and metallic laminae 18″, 20″, i.e., the value of θ is about equal for all the laminae 18″, 20″. Thereby, the entire laminated body 12 formed by all of the laminae 18″, 20″ being sized and arranged as described has a body angle α defined between two circumferential sides 12a, 12b and the central axis $A_C$ that has a value about equal to the value of the angle θ of the individual lamina 18″ or 20″.

Preferably, the value of each lamina angle θ is between about fifteen degrees (15°) and about one hundred eighty degrees (180°), and therefore also the body angle α of the bearing component 10, but may have any desired value, such as for example, ten degrees (10°) or even less. The particular value of the angles θ, α generally depends on the intended number of bearing components 10 desired for a particular bearing assembly 11, and each component 10 may have substantially the same or substantially different body angles α within a specific bearing assembly 11. For example, if desired to make a bearing assembly 10 with two bearing components 10, then each bearing component 10 may be formed and sized such that the body angle α is up to (and at least slightly less than) one hundred eighty degrees (180°), with appropriate sizing of the connectors 14, 16. Further for example, if desired to make the bearing assembly 11 including three bearing components 10, each bearing component body 12 may be formed and sized such that the angle θ is up to (and at least slightly less than) one hundred twenty degrees (120°). However, the bearing assembly 11 may be formed of any desired number of bearing components 10 formed having any desired body angle α, such as the two bearing components 10 with body angles α of about 120° as shown in FIG. 9. Further, the bearing assembly 11 may be used either singularly or in combination with another bearing assembly 11, such as for example, with the laminae 18″, 20″ formed as conical elements (FIG. 18) and the two assemblies 11 positioned "back-to-back" to enable axial load balancing.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A component of a laminated bearing assembly for movably coupling an inner member with an outer member, the outer member having a bore, the bearing assembly component comprising:
    a laminated body disposeable within the outer member bore and having an inner radial end connectable with the inner member and an outer radial end connectable with the outer member, the body being formed of a plurality of alternating, generally arcuate elastomeric and metallic laminae nested generally about a central axis, each one of the elastomeric and metallic laminae having opposing first and second arcuate ends spaced apart circumferentially about the central axis and inner and outer circumferential surfaces extending circumferentially between the first and second arcuate ends, each metallic lamina having a radial thickness varying circumferentially between a first value at the first, radially-widest arcuate end and a second, lesser value at the second, radially-narrowest arcuate end.

2. The laminated bearing assembly component as recited in claim 1 wherein one of:
    each elastomeric lamina has a substantially constant radial thickness between the first and second arcuate ends; and
    each elastomeric lamina has a radial thickness varying circumferentially between a first value at the first, radially-widest arcuate end and a second, lesser value at the second, radially-narrowest arcuate end, the elastomeric and metallic laminae being arranged such that the radially-narrowest end of each one of at least a portion of the elastomeric laminae is disposed generally between the radially-widest ends of two adjacent metallic laminae.

3. The laminated bearing assembly component as recited in claim 1 wherein:
    each elastomeric lamina has a substantially constant radial thickness between the first and second arcuate ends; and
    the laminated body has a first circumferential side with a first radial length and an opposing second circumferential side with a second radial length, each metallic laminae first arcuate end being located at least generally proximal to the body first radial side and each metallic laminae second arcuate end being located at least generally proximal to the body second radial side such that the first radial length is substantially greater than the second radial length.

4. The laminated bearing assembly component as recited in claim 3 further comprising:
    an inner connector configured to connect the laminated body inner radial end with the inner member and having an outer circumferential surface, an innermost one of the elastomeric laminae being attached to the inner connector outer surface; and
an outer connector configured to connect the laminated body outer radial end with the outer member and having an inner circumferential surface, an outermost one of the elastomeric laminae being attached to the outer connector inner surface.

5. The laminated bearing assembly component as recited in claim 4 wherein the inner connector outer surface has a generally constant radius about the central axis and the outer connector inner surface has radius about the central axis varying between a first value proximal to the laminated body first circumferential side and a second, greater value proximal to the laminated body second circumferential side such that a spacing distance between the inner connector and the outer connector has a first value at the laminated body first circumferential side and a second, greater value at the laminated body second circumferential end.

6. The laminated bearing assembly component as recited in claim 1 wherein:
   each elastomeric lamina has a radial thickness varying circumferentially between a first value at the first, radially-narrowest arcuate end and a second, greater value at the second, radially-widest arcuate end, the elastomeric and metallic laminae being arranged such that the radially-narrowest end of each one of at least a portion of the elastomeric laminae is disposed generally between the radially-widest ends of two adjacent metallic laminae
   at least a portion of the metallic laminae are arranged in pairs of adjacent inner and outer metallic laminae, the outer surface of the inner metallic lamina and the inner surface of the outer metallic lamina being generally radially converging in a first angular direction about the central axis such that the one of the elastomeric laminae disposed between the pair of metallic laminae is generally compressed against the converging outer and inner circumferential surfaces when a torque is applied on the laminated component in the first angular direction.

7. The laminated bearing assembly component as recited in claim 1 wherein each one of the elastomeric and metallic laminae is one of:
   partially spherical such that the inner surface of each one of the elastomeric and metallic laminae is generally concave and the outer surface of each one of the elastomeric and metallic laminae is generally convex;
   substantially circular cylindrical; and
   substantially conical.

8. The laminated bearing assembly component as recited in claim 1 further comprising:
   an inner connector configured to connect the laminated body inner radial end with the inner member, an innermost one of the elastomeric laminae being attached to the inner connector; and
   an outer connector configured to connect the laminated body outer radial end with the outer member, an outermost one of the elastomeric laminae being attached to the outer connector.

9. The laminated bearing assembly component as recited in claim 8 wherein:
   each one of the elastomeric and metallic laminae is partially spherical and has a center of curvature, the center of curvature of each one of the elastomeric and metallic laminae being at least generally coincident with the center of curvature of each other one of the elastomeric and metallic laminae; and
   the inner connector has a partially spherical outer surface with a center of curvature, the innermost elastomeric lamina being attached to the inner member outer surface such that the center of curvature of the connector outer surface is one of generally coincident with the centers of curvature of the elastomeric and metallic laminae and is spaced axially along the centerline from the centers of curvature of the elastomeric and metallic laminae.

10. The laminated bearing assembly component as recited in claim 1 wherein each one of the elastomeric and metallic laminae has a circumferential length extending between the first and second arcuate ends, the laminae being arranged such that the circumferential length of each one of the elastomeric and metallic laminae is greater than the circumferential length of each other lamina disposed radially inwardly of the one lamina.

11. The laminated bearing assembly component as recited in claim 1 wherein an angle is defined between the two arcuate ends of each one of the elastomeric and metallic laminae and the central axis, the angle of each one of the elastomeric and metallic laminae having a value about equal to the value of the angle of each other one of the elastomeric and metallic laminae.

12. The laminated bearing assembly component as recited in claim 11 wherein the value of each angle is between about fifteen degrees and about one hundred eighty degrees.

13. A laminated bearing assembly for movably coupling a central inner member with an outer member, the inner member having a central axis and the outer member having a bore, the bearing assembly comprising:
   at least two laminated bearing components each being disposeable at least partially within the outer member bore and having an inner radial end connectable with the inner member so as to be spaced apart about the central axis and an outer radial end connectable with the outer member, each bearing component including a laminated body formed of a plurality of alternating, generally arcuate elastomeric and metallic laminae nested generally about a central axis, each one of the elastomeric and metallic laminae having opposing first and second arcuate ends spaced apart circumferentially about the central axis and inner and outer circumferential surfaces extending circumferentially between the first and second arcuate ends, each metallic lamina being generally wedge-shaped and having a radial thickness varying circumferentially between a first value at the first, radially-widest arcuate end and a second, lesser value at the second, radially-narrowest arcuate end.

14. The laminated bearing assembly as recited in claim 13 wherein one of:
   each elastomeric lamina has a substantially constant radial thickness between the first and second arcuate ends; and
   each elastomeric lamina has a radial thickness varying circumferentially between a first value at the first, radially-narrowest arcuate end and a second, greater value at the second, radially-widest arcuate end, the elastomeric and metallic laminae being arranged such that the radially-narrowest end of each one of at least a portion of the elastomeric laminae is disposed generally between the radially-widest ends of two adjacent metallic laminae.

15. The laminated bearing assembly as recited in claim 13 wherein:

each elastomeric lamina has a substantially constant radial thickness between the first and second arcuate ends; and the laminated body has a first circumferential side with a first radial length and an opposing second circumferential side with a second radial length, each metallic laminae first arcuate end being located at least generally proximal to the body first radial side and each metallic laminae second arcuate end being located at least generally proximal to the body second radial side such that the first radial length is substantially greater than the second radial length.

16. The laminated bearing assembly as recited in claim 15 further comprising:

an inner connector configured to connect the laminated body inner radial end with the inner member and having an outer circumferential surface, an innermost one of the elastomeric laminae being attached to the inner connector outer surface; and an outer connector configured to connect the laminated body outer radial end with the outer member and having an inner circumferential surface, an outermost one of the elastomeric laminae being attached to the outer connector inner surface.

17. The laminated bearing assembly as recited in claim 13 wherein:

each elastomeric lamina has a radial thickness varying circumferentially between a first value at the first, radially-narrowest arcuate end and a second, greater value at the second, radially-widest arcuate end, the elastomeric and metallic laminae being arranged such that the radially-narrowest end of each one of at least a portion of the elastomeric laminae is disposed generally between the radially-widest ends of two adjacent metallic laminae at least a portion of the metallic laminae are arranged in pairs of adjacent inner and outer metallic laminae, the outer surface of the inner metallic lamina and the inner surface of the outer metallic lamina being generally radially converging in a first angular direction about the central axis such that the one of the elastomeric laminae disposed between the pair of metallic laminae is generally compressed against the converging outer and inner circumferential surfaces when a torque is applied on the laminated component in the first angular direction.

18. The laminated bearing assembly as recited in claim 13 further comprising:

an inner connector configured to connect the laminated body inner radial end with the inner member, an innermost one of the elastomeric laminae being attached to the inner connector; and an outer connector configured to connect the laminated body outer radial end with the outer member, an outermost one of the elastomeric laminae being attached to the outer connector.

19. The laminated bearing assembly as recited in claim 13 wherein an angle is defined between the two arcuate ends of each one of the elastomeric and metallic laminae and the central axis, the angle of each one of the elastomeric and metallic laminae having a value about equal to the value of the angle of each other one of the elastomeric and metallic laminae.

20. A mechanical assembly comprising:

an inner member having a central axis;

an outer member having a bore, at least one of the inner and outer members being angularly displaceable about the central axis;

at least one laminated body disposed within the outer member bore and having an inner radial end connected with the inner member and an outer radial end connected with the outer member, the body being formed of a plurality of alternating, generally arcuate elastomeric and metallic laminae nested generally coaxially about a central axis, each one of the elastomeric and metallic laminae having opposing first and second arcuate ends spaced apart circumferentially about the central axis and inner and outer circumferential surfaces extending circumferentially between the first and second arcuate ends, each metallic lamina is generally wedge-shaped and has a radial thickness varying circumferentially between a first value at the first, radially-widest arcuate end and a second, lesser value at the second, radially-narrowest arcuate end.

* * * * *